Feb. 24, 1942.  W. A. ANDERSON  2,274,575
INSTALLMENT POSTING MACHINE
Filed Sept. 25, 1936  11 Sheets-Sheet 1
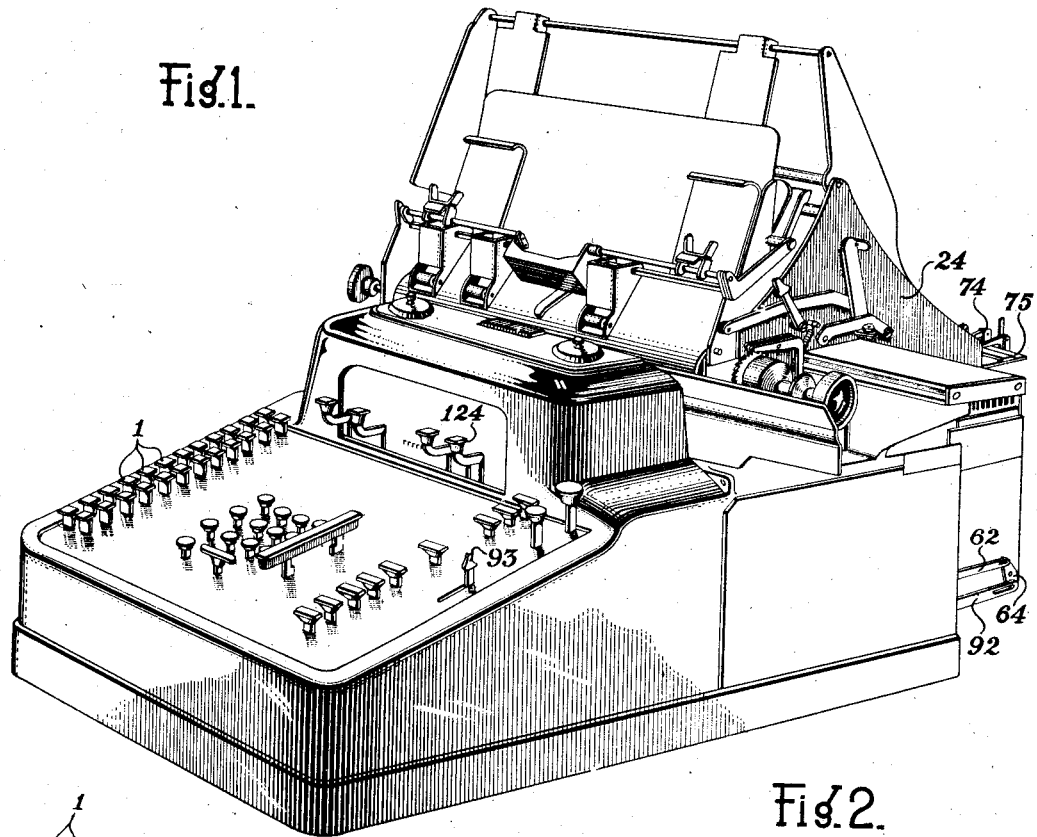
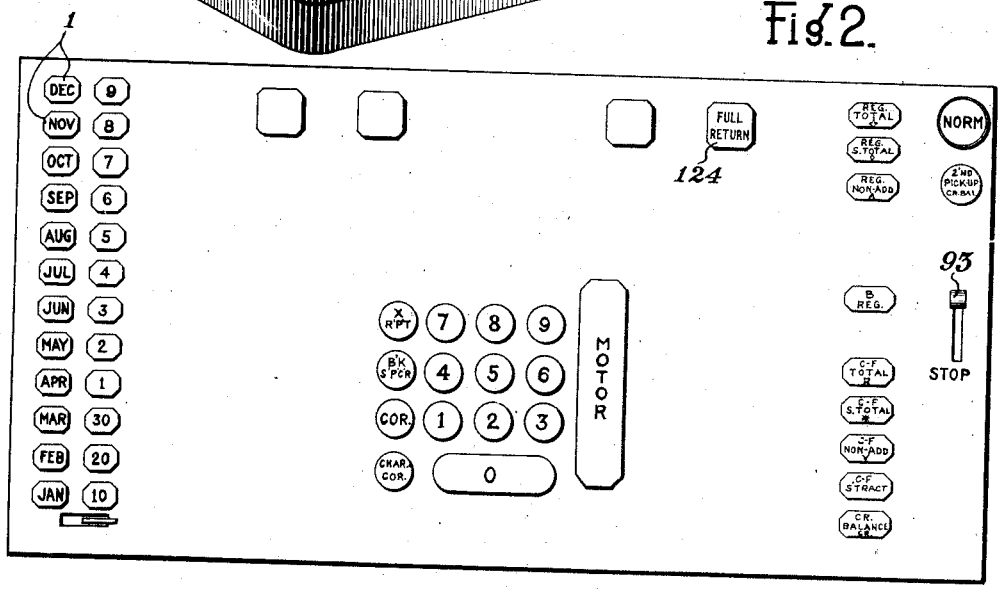
INVENTOR
WALTER A. ANDERSON.
BY
ATTORNEY

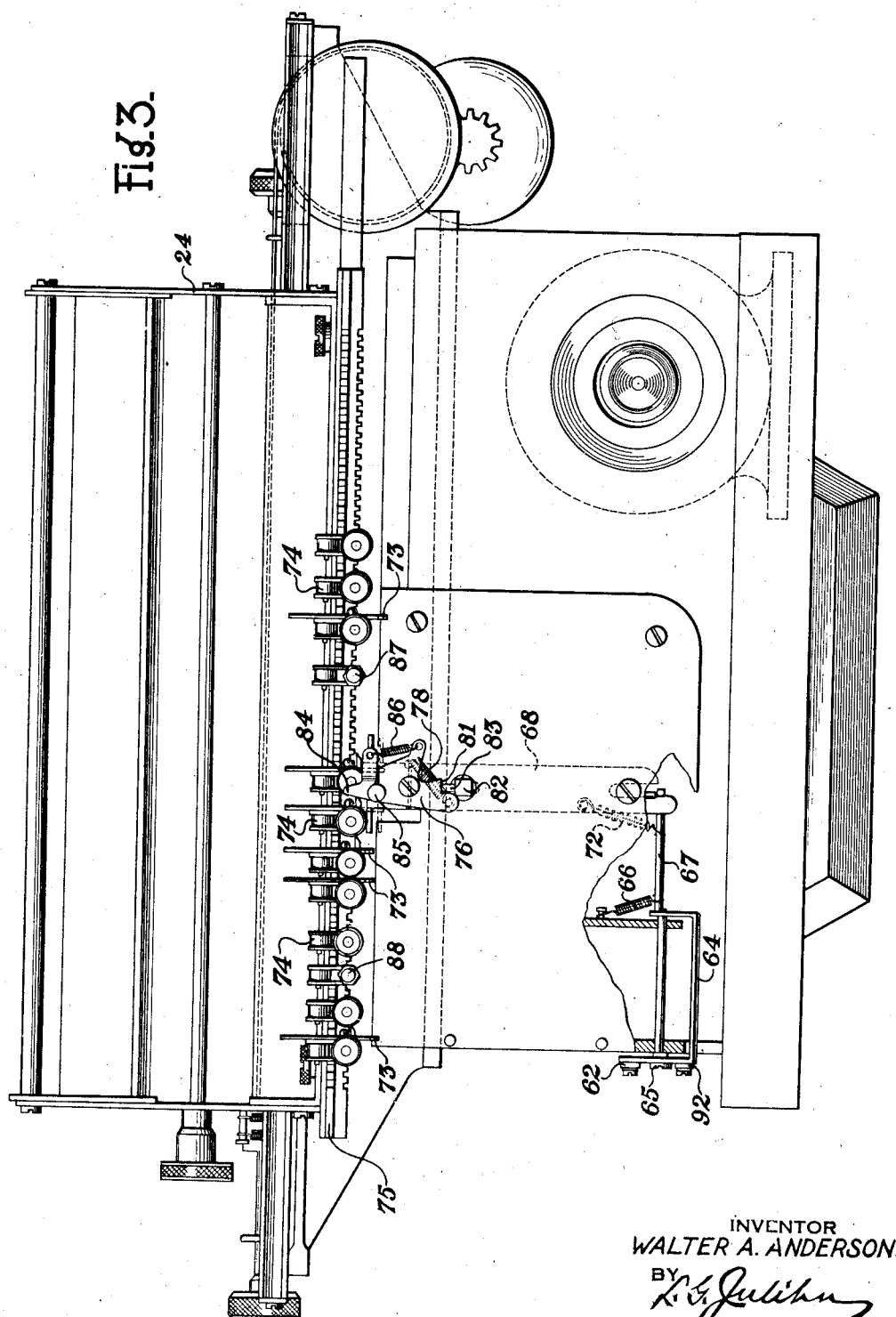

Feb. 24, 1942. W. A. ANDERSON 2,274,575
INSTALLMENT POSTING MACHINE
Filed Sept. 25, 1936 11 Sheets-Sheet 5

INVENTOR
WALTER A. ANDERSON.
BY
ATTORNEY

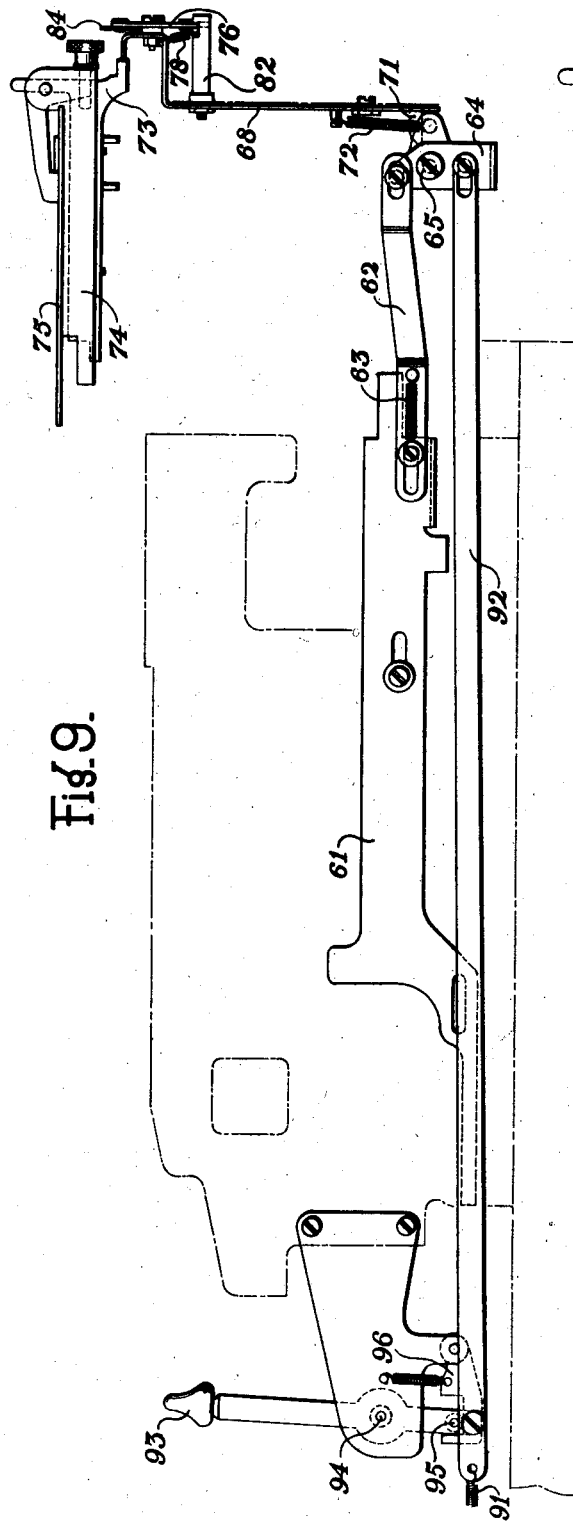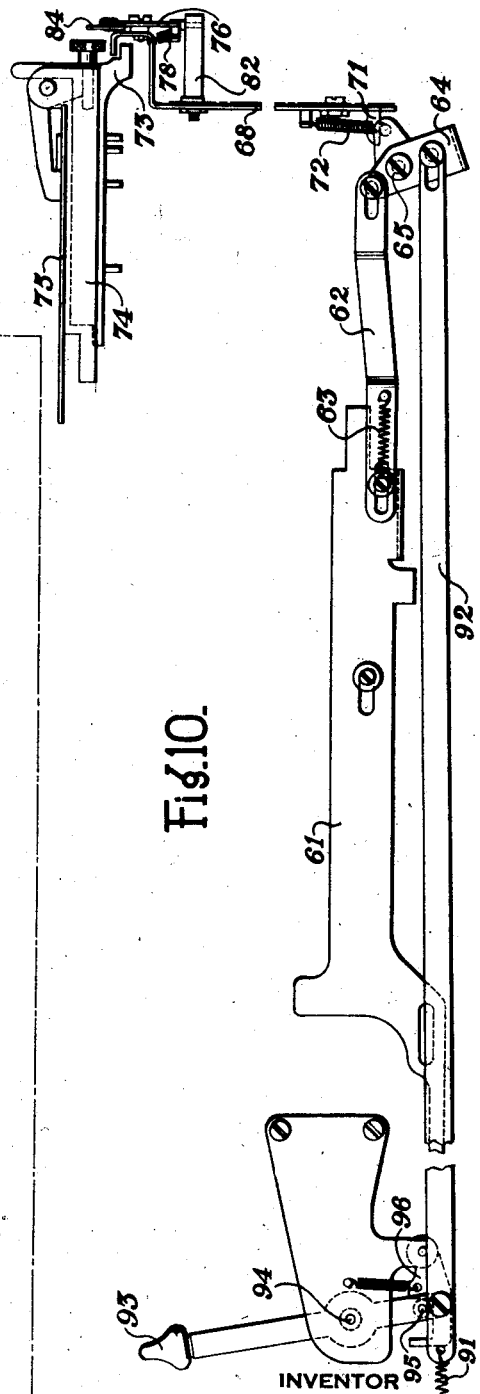

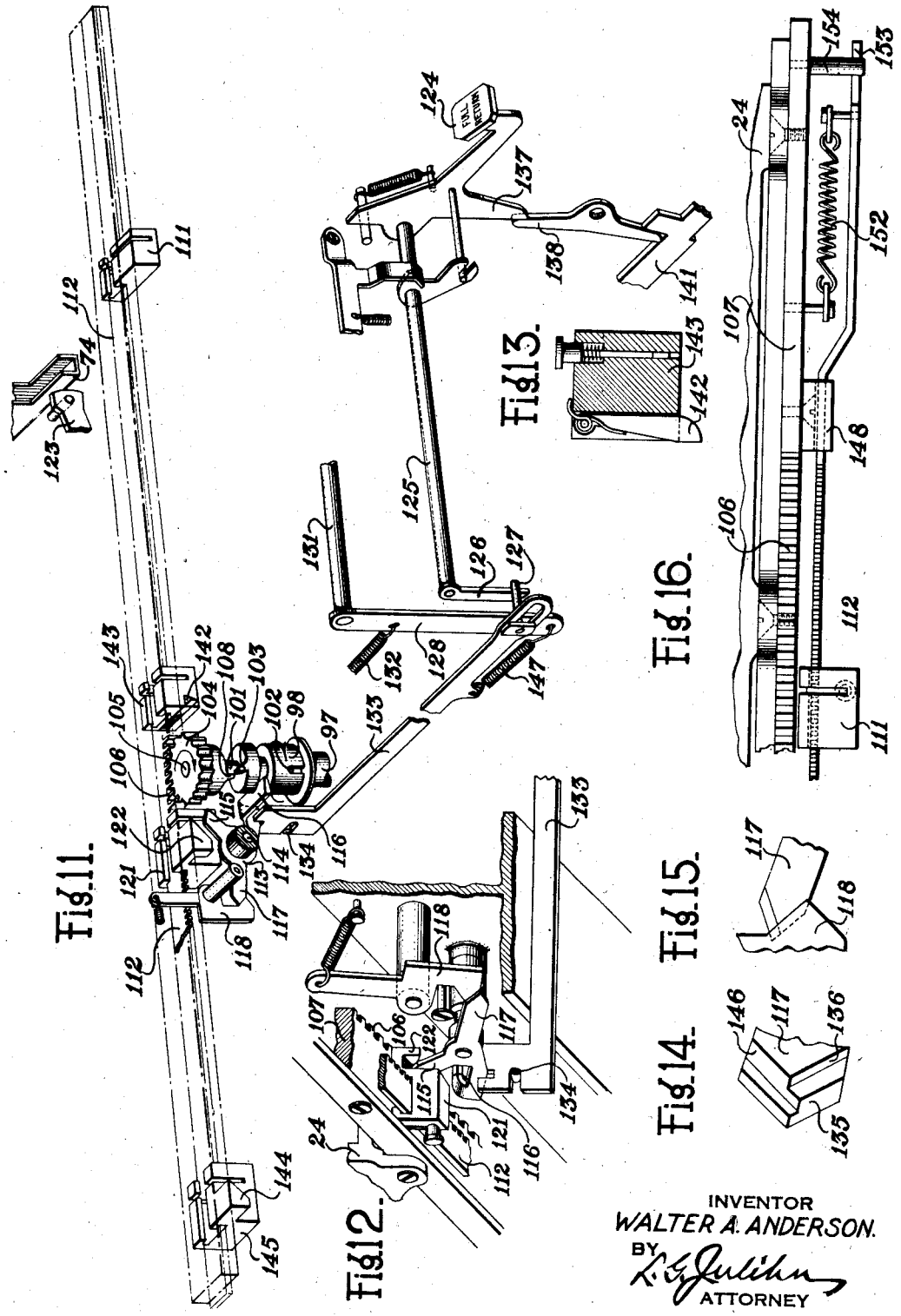

Feb. 24, 1942.　　　W. A. ANDERSON　　　2,274,575
INSTALLMENT POSTING MACHINE
Filed Sept. 25, 1936　　　11 Sheets-Sheet 9

INVENTOR
WALTER A. ANDERSON.
BY
ATTORNEY

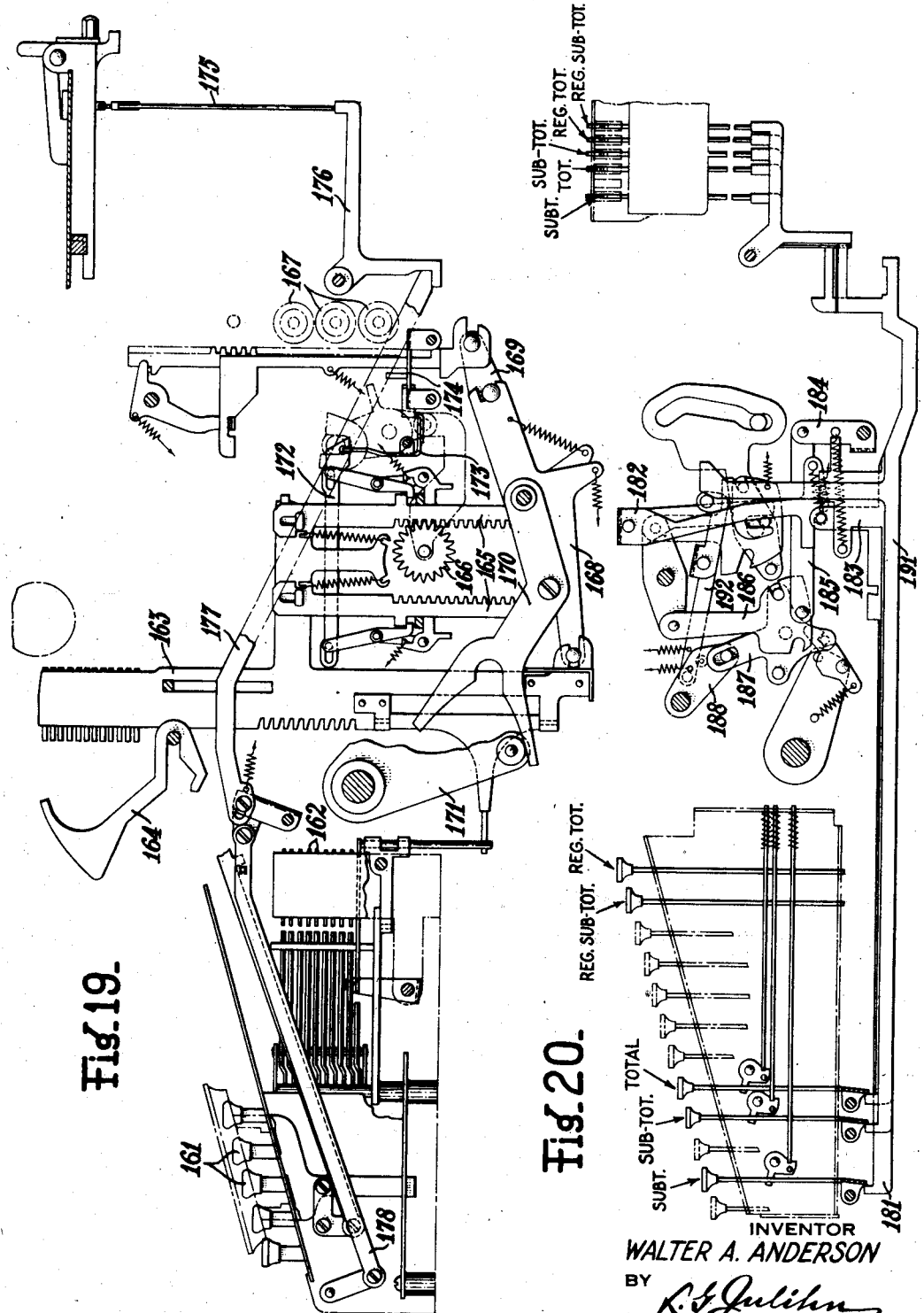

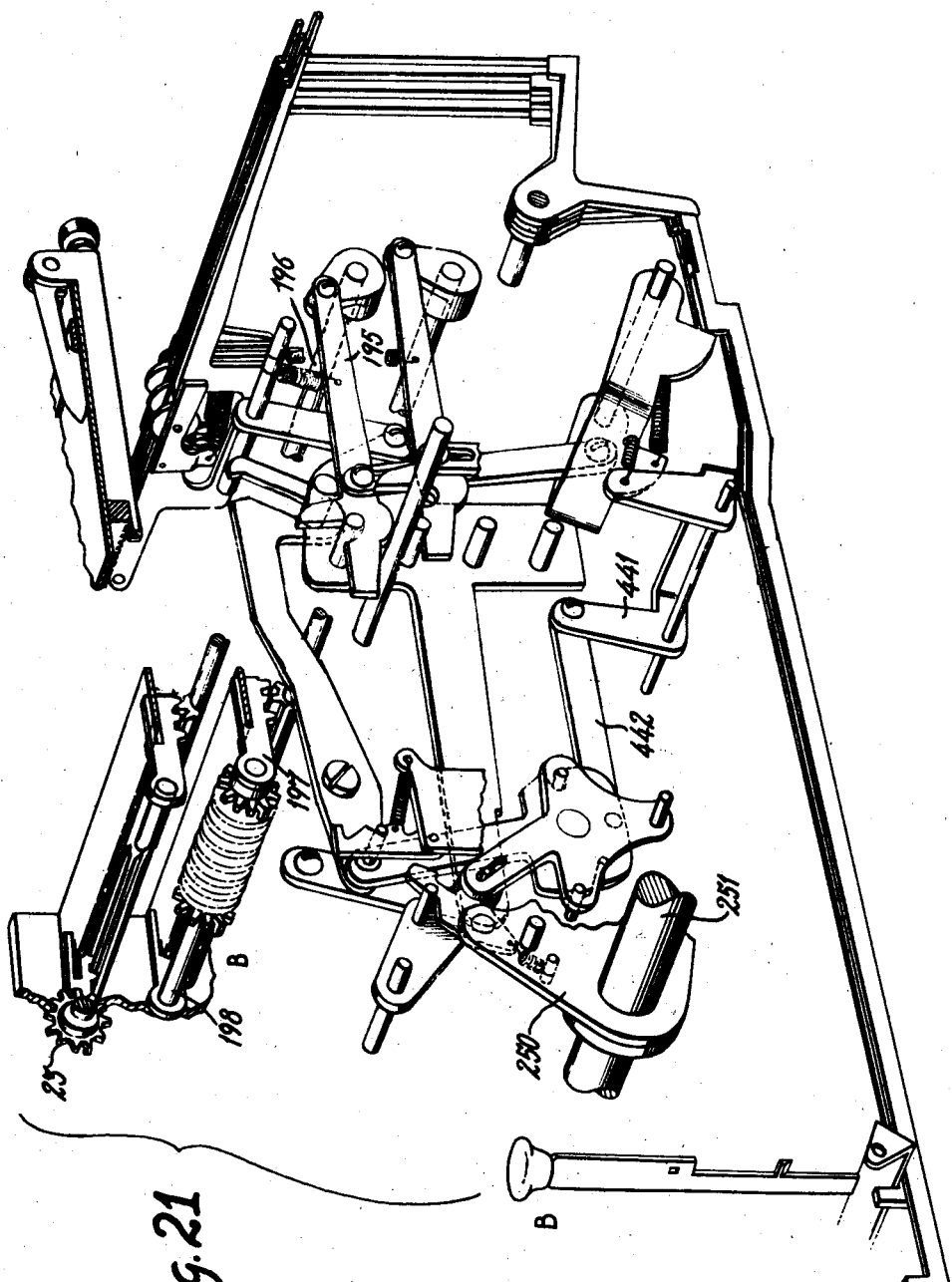

Patented Feb. 24, 1942

2,274,575

UNITED STATES PATENT OFFICE 2,274,575

INSTALLMENT POSTING MACHINE

Walter A. Anderson, Bridgeport, Conn., assignor to Underwood Elliott Fisher Company, New York, N. Y., a corporation of Delaware Application September 25, 1936, Serial No. 102,517

15 Claims. (Cl. 235—60)

This invention relates to bookkeeping machines and more particularly to the type for posting a schedule of installment payments to be made in the re-payment of a loan. Although the invention is not limited to this particular problem, the latter is used as an illustration of one type of work that may be performed on the machine.

When a business house makes a loan, it is customary to repay the loan in equal monthly installments, and it is desirable to have printed, at the time the loan is made, a schedule of such installments, together with the remaining balance after the payment of each installment. By this record it is possible for the loan agency or the customer to determine instantly the status of the account. It is especially helpful in cases where the amount of the installment is changed during the course of payment.

The present invention provides a machine capable of printing such a record, it being necessary, to have the entire record printed, only to enter the total amount of the loan, the installment payment amount, and start the machine.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

In said drawings:

Figure 1 is a perspective of the machine,

Figure 2 is a diagrammatic view of the keyboard,

Figure 3 is a back elevation of the machine,

Figure 4:
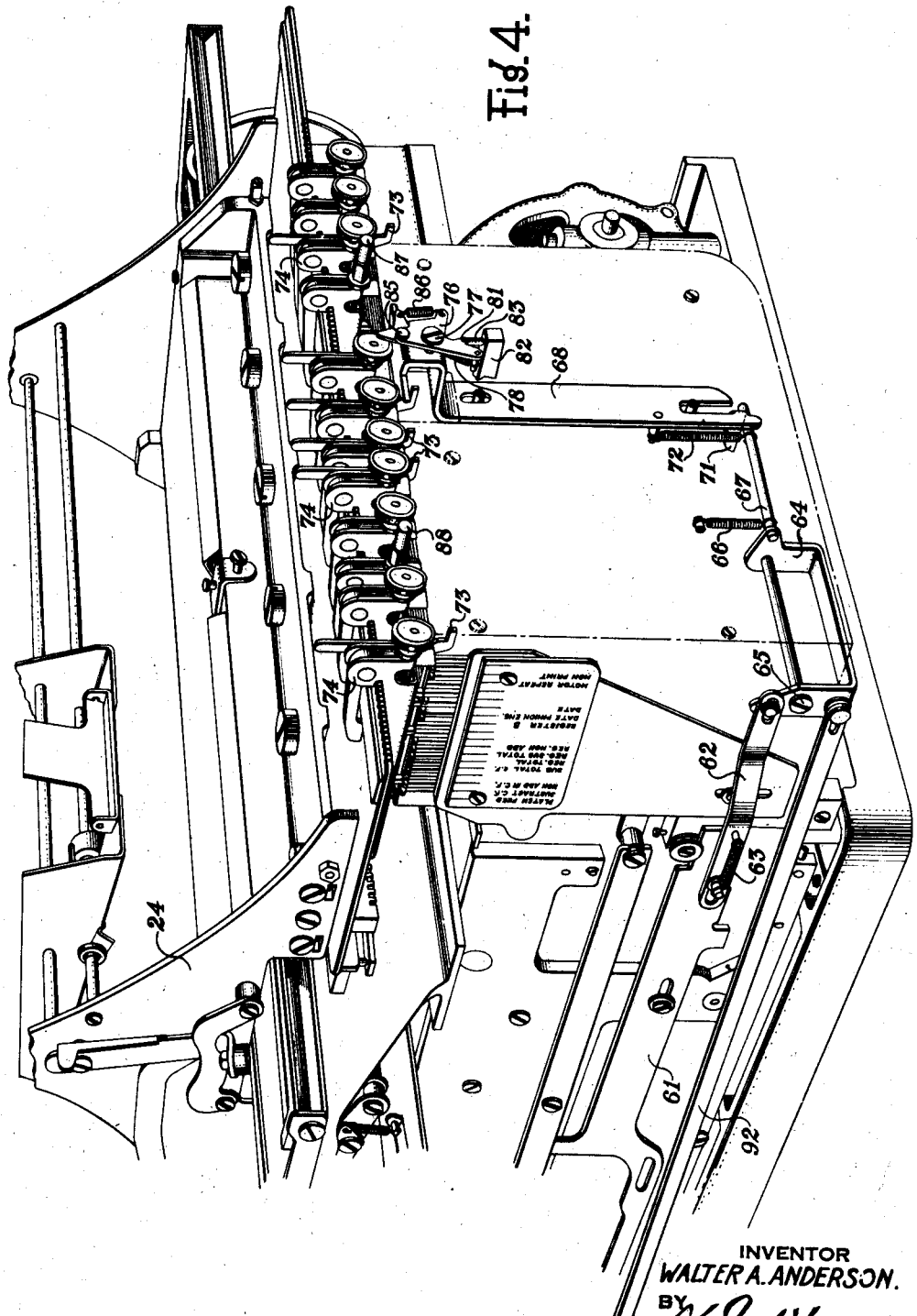
Figure 5:
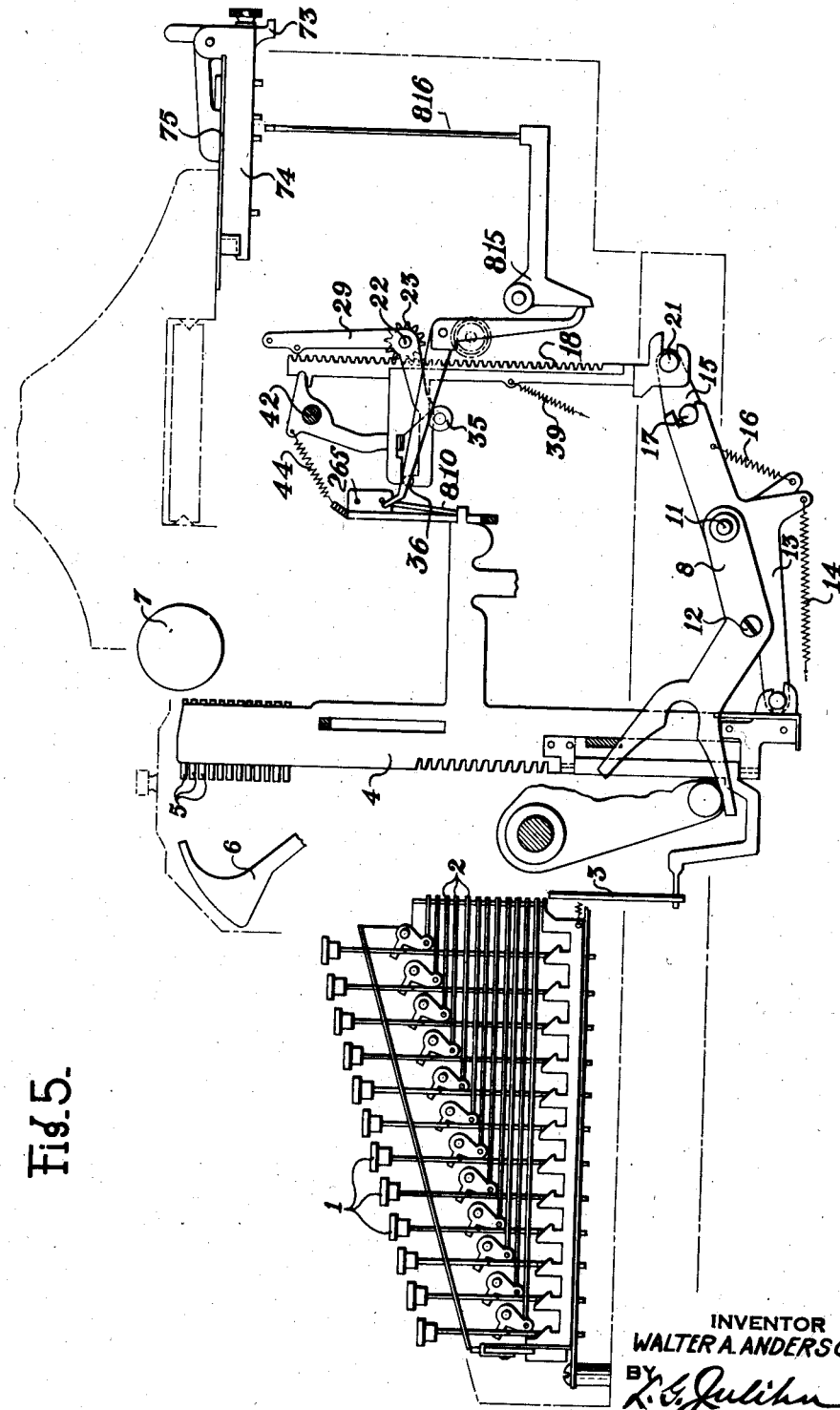
Figure 6:
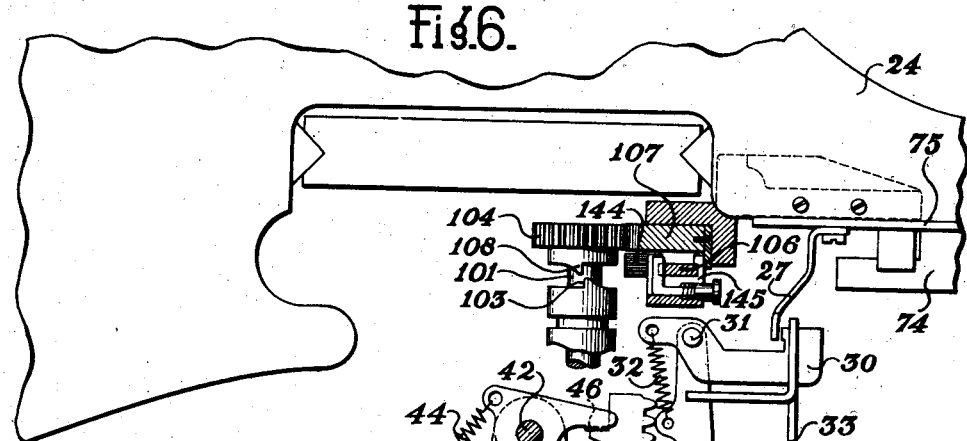
Figure 7:
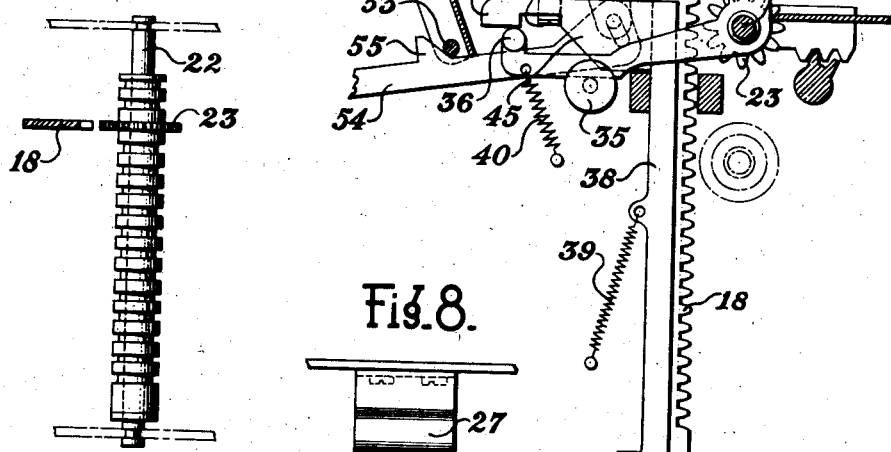
Figure 8:
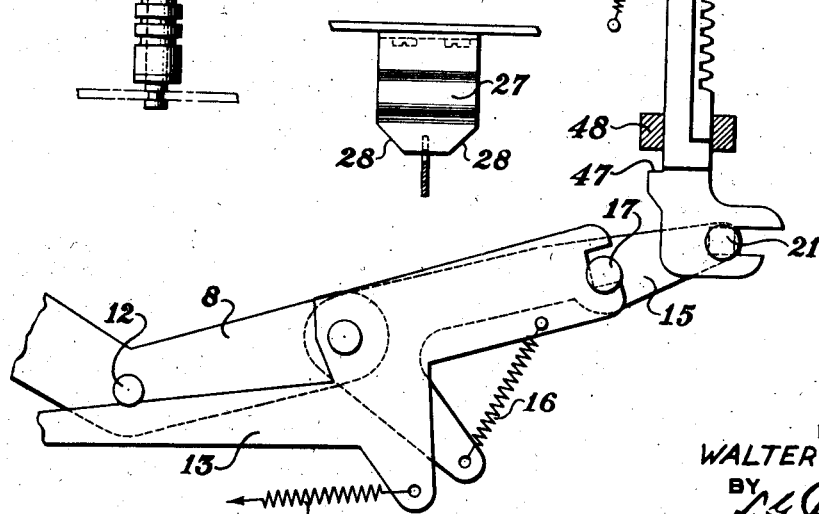
Figure 17:
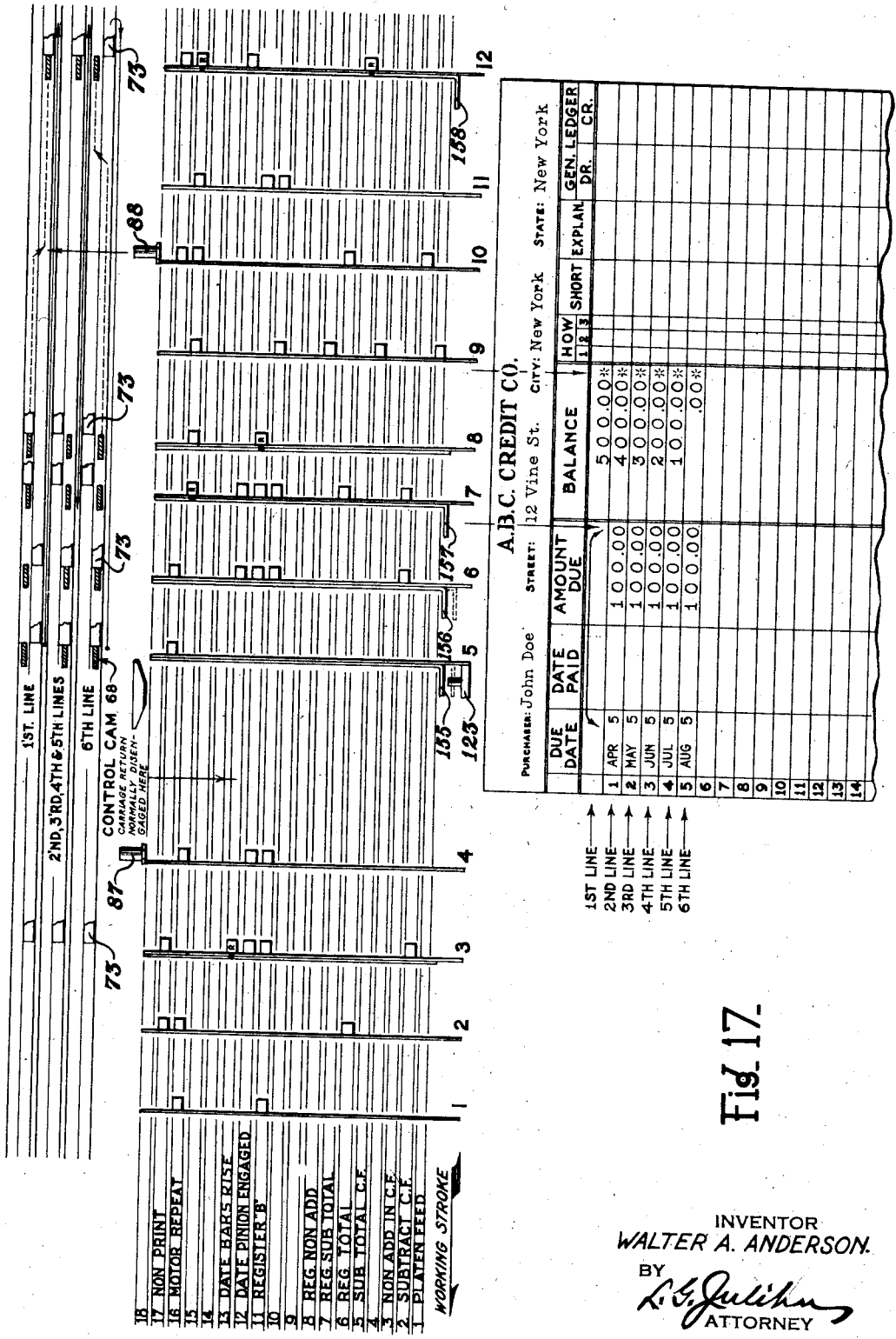

Figure 4 is a perspective of the rear side and back of the machine with the cover removed and certain parts omitted for the sake of clearness, Figure 5 is a right side elevation showing the date setting and printing mechanisms, Figure 6 is a right side view showing the details of the date setting and advancing mechanism, Figures 7 and 8 are details of parts shown in Figure 6, Figures 9 and 10 are right side elevations of the magazine slide control cam and the means for operating it, Figure 9 showing the cam in its lower normal position and Figure 10 showing it in its raised position, Figure 11 is a front left perspective of the connections for returning the carriage by the full return key, Figure 12 is a left rear bottom perspective showing details of certain of the parts shown in Figure 11, Figures 13, 14 and 15 show details of certain parts shown in Figure 11, Figure 16 is a front elevation of the carriage return rack and its cushioning mechanism, Figure 17 is a diagrammatic view of the carriage controls shown in reference to a sample record sheet.

Figure 18:
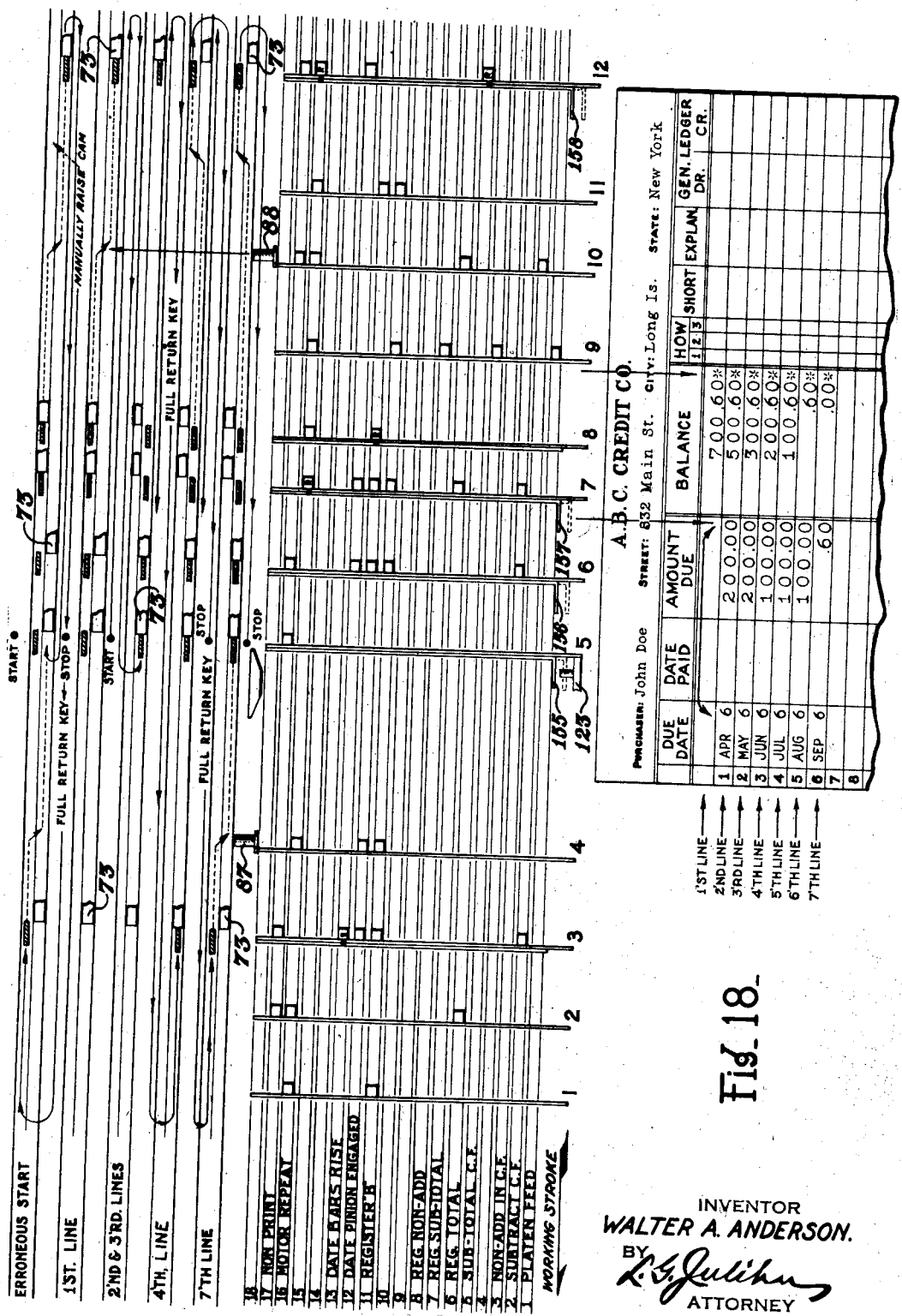

Figure 18 is a diagrammatic view of the carriage controls shown in reference to a record sheet illustrating a change of installment payment and the payment of a small residual balance, Figure 19 is a right side elevation showing the actuating mechanism for the crossfooter and registers, the crossfooter overdraft mechanism, and parts of the automatic cycling mechanism, Figure 20 is a right side elevation showing the parts that control substraction and the taking of totals and sub-totals, and Figure 21 is a perspective view showing the mechanism for engaging and disengaging the "Month" date pinion and the "B" register.

GENERAL DESCRIPTION

The machine is of the 10-key, key set, motor operated type, having one crossfooter and a plurality of adding totalizers. It is quite similar to the machine fully disclosed in Patent No. 2,194,270, issued to Oscar J. Sundstrand on March 19, 1940, and in British Patent No. 401,904, accepted November 23, 1933. This machine has a traveling paper carriage movable to a plurality of columns for listing amounts horizontally across a record sheet. The carriage is returned automatically upon reaching the left end of its travel. The various machine functions are controlled automatically through a control plate secured on the rear of the carriage. This control plate carries a number of magazines, one for each columnar position, having control lugs depending therefrom at proper positions in the magazines.

To perform its intended function the amount of the loan is entered on the keyboard and the motor bar depressed. The amount of installment payment is then entered on the keyboard, the date on which the first installment is due is set up on the date keys and the motor bar is again depressed. The machine then operates, automatically advancing the months, printing the same installment payment opposite each month, and printing the reduced balance opposite the installment payments. After the last installment is entered the machine stops and the operator removes the card.

In the event that the amount of payment is changed during the period of repayment of the loan it is necessary for the operator to depress the carriage full return key and set up the amount of the new installment, and to again start the machine by depression of the motor bar.

If there is a small residual balance to be paid after the payment of the last installment, it is again necessary to depress the full return key and set up on the keyboard the residual amount. Depression of the motor bar will then enter this amount and the machine will come to rest in the usual manner.

DETAILED DESCRIPTION

The general actuation of the machine, including the functions of adding, subtracting, total taking, sub-total taking, platen feeding, engagement of the crossfooter and adding register, printing, non-printing, cycle repeating, transferring of totals, and the controlling of these various functions by stationary or retracting control lugs depending from magazines secured on the traveling carriage are the same as disclosed in the above mentioned patents. For this reason, only so much of the general mechanism is shown as is necessary to properly connect the new parts with the old.

A condensed showing of some of these mechanisms is illustrated in Figures 19 and 20. In Figure 19, the amount entering and printing is illustrated by amount keys 161, index pins 162, type bars such as 163, printing hammers such as 164, totalizer actuators 165, a crossfooter 166 and registers 167. The operating mechanism for the type bars and actuators is shown at 168, 169, 170 and 171. The customary overdraft mechanism, operated by the highest order wheel of the crossfooter 166, is shown at 172, 173, 174 and slide 31 (Figure 4). The cycle repeating mechanism controlled by the traveling paper carriage is shown in Figure 19, and includes the parts 175, 176, 177 and 178.

The subtract mechanism is shown in Figure 20, and includes the subtract key, the slide 181 and the bail 182. The total mechanism for the crossfooter is shown in Figure 20, and includes the total key, the slide 183, the bail 184, the link 185, and the parts 186 and 187. The sub-total mechanism for the crossfooter includes the sub-total key, the slide 191 and the lever 192. The total and sub-total mechanisms for the registers include the total and sub-total keys shown in Figure 20 and parts similar to those shown for taking totals and sub-totals on the cross-footer. Figure 20 also illustrates the connections from the traveling paper carriage for controlling the total and sub-total taking mechanisms for the crossfooter and registers.

PRINTING AND AUTOMATICALLY ADVANCING THE DATE

Referring to Figures 2 and 5, a row of month keys 1 are depressible to project rods 2 into the path of a rod 3 connected to a month type bar 4. This type bar carries month printing type 5 actuated by printing hammers 6 to print the month on record material supported around the usual roller platen 7. An actuator 8 is pivoted on a stationary rod 11 and carries a stud 12 normally bearing against a lever 13 also pivoted at 11 and tensioned clockwise by a spring 14. A bell crank 15 also is pivoted at 11 and is tensioned counter-clockwise in relation to lever 13 by a spring 16. Relative motion between the lever 13 and bell crank 15 is limited by a stud 17 situated in a wide notch in the right hand end of lever 13. During the normal actuation of the machine the actuator 8 is moved clockwise about its pivot 11, allowing spring 14 to move lever 13 therewith. After a short increment of movement, lever 13 causes bell crank 15 to rotate with it, lowering a rack 18 pivoted thereto by a stud 21. The parts 13, 15 and 18 thereupon move a distance commensurate with the distance the rod 3 travels before striking the projected rod 2, at the end of which movement lever 13 is arrested and actuator 8 continues to the end of its regular excursion. After the actuator reaches its fully moved position a shaft 22 (Figures 6 and 7) is moved to the left to engage a 12-tooth pinion 23 with rack 18. This shaft 22 corresponds to the "A" register shaft in the above mentioned patents, and is moved toward and from the actuator rack 18 at the same times during the operation and by the same mechanism as the said "A" register shaft. Subsequent return movement of the actuator rotates lever 13 counter-clockwise and raises rack 18 to its initial position shown in Figures 5 and 6. This return movement causes pinion 23 to be rotated a distance corresponding to the month key depressed. For example, referring to Figure 2, if the January key is depressed, pinion 23 is rotated the distance of one tooth, and if the May key is depressed, pinion 23 is rotated the distance of five teeth. At the end of the machine cycle, the depressed key 1 is restored by the customary key restoring mechanism.

The manner in which shaft 22 is engaged and disengaged during a machine cycle will now be described. The shaft normally lies disengaged from the actuating rack 18. The means for connecting the shaft for engagement during the cycle includes a carriage selector 744 (Figure 21). Depression of the carriage selector moves a slide 406 forward. Slide 406 has a shoulder 410 which bears against a lug 411 on a bail 412. A spring 416 tends to swing bail 412 downwardly and move slide 406 rearwardly. Bail 412 is connected to a link 376 through a link 417, there being a pin and slot connection 417ª, 417ᵇ between these two parts. Depression of selector 744 raises link 417 so that link 376 may be raised by a spring 381 connected to it to engage notch 379 in its forward end and with a pin 380 on a slide 377 when slide 377 operates during the cycle. Normally a pin 418 lies directly in front of link 376 to hold shaft 22 disengaged, but when slide 406 is moved forwardly preparatory to a machine cycle, and slide 377 is moved rearwardly during the first part of the cycle, spring 381 raises link 376, engaging notch 379 with pin 380 and raising the forward end of link 376 above pin 418.

Movement of slide 377 forwardly at the beginning of the second half of the cycle will then pull link 376 forwardly, and through arm 375, shaft 374, segment 373 and rack 372, engage the pinion 23 with its actuating rack 18. It then remains engaged with the rack for the remainder of the cycle. It is disengaged at the very beginning of the next cycle when slide 377 is moved to the rear in the event that selector 744 is not again depressed.

The means for moving slide 377 rearwardly at the beginning of a cycle and forwardly at the beginning of the second half of the cycle includes a lever 382 pivoted at 161 and having a cam slot 384 in its rear end embracing a pin 385 on slide 377. Lever 382 is lowered and raised during the machine cycle by the raising and lowering of the link 386 by a lever 389. Link 386 and lever 389 are operated from the main actuating shaft 251 by a pawl 392 pivoted on an arm 250 secured to the main actuating shaft. Pawl 392 oscillates lever 389 counter-clockwise at the beginning of a cycle to disengage the date pinion from rack 18, and oscillates lever 389 clockwise at the beginning of the second half of the cycle to reengage the pinion with the rack, so that if the rack is advanced during the second half of the cycle, the pinion will be rotated ' 'the rack when the latter is returned to its normal position.

For taking totals from the date pinion, the same engaging mechanism is used except that link 386 is shifted forwardly by a link 442, under control of a bail 441, that is moved by No. 6 and No. 7 carriage controls. This forward movement of link 386 effects the necessary alteration in the timing of the oscillation of slide 377 to engage and disengage the date pinion at the proper time in the cycle to take a total.

It might be mentioned here that this same engaging and disengaging mechanism is also used for adding and total taking on the "B" register, the connections between these parts and the "B" register including link 195, rod 196, racks 197 and the "B" register shaft 198 (Figure 21).

This engaging and disengaging mechanism is similar in every respect to that disclosed in the above mentioned Patent No. 2,194,270 in connection with the rear registers "A" and "B" in that patent.

An additional mechanism now to be described is provided for rotating pinion 23 one step during certain operations of the machine.

The traveling paper carriage 24 (Figure 6) carries a depending lug 27 provided with cam surfaces 28 (Figure 8) on either side. A floating bell crank 29 is pivoted on shaft 22 and has a hook 30 pivoted at 31 on its upper end. A spring 32 retains the rear end of the hook in its upper position. A bracket 33 is secured to the machine frame and has a slot into which the hook 30 extends to hold the latter against side play. The upper end of the slot restrains upward movement of the hook due to the tension of spring 32. The rear end of the hook normally lies to the rear of the lower edge of lug 27, as shown in Figure 6. The lower arm of bell crank 29 extends forwardly in the machine and lies within a slot in a stud 35 secured to the machine frame. The forward end of this arm carries a round shoulder 36 lying beneath a finger 37 on the upper end of a slide 38. A weak spring 39 is attached to the slide and to a stationary portion of the machine. A spring 40 is attached to the forward arm of bell crank 29 and to a stationary portion of the machine, tensioning the bell crank counter-clockwise about its pivot 22.

Another bell crank 41 pivoted on a shaft 42 has a laterally extending shoulder 43 on its lower end engaging a vertical shoulder on the slide 38. Bell crank 41 is tensioned counter-clockwise by a spring 44.

By these parts when the carriage reaches the columnar position where lug 27 lies in front of hook 30 and the date pinion 23 is engaged, lug 27 prevents hook 30 and the upper arm of bell crank 29 from moving forward, whereupon shoulder 36 moves upwardly and forwardly a short distance against the tension of spring 40. This distance is sufficient to raise the slide 38 until shoulder 43 contacts an inclined edge 45 on slide 38, whereupon the tension of spring 16, causing rack 18 to press upwardly on an offset shoulder 46 on bell crank 41, rotates the bell crank counter-clockwise, the slide 38 rising against the tension of spring 39 and the rack 18 rising therewith a sufficient distance to move pinion 23 the space of one tooth. This occurs at the beginning of the return stroke of the machine. The upward movement of rack 18 is limited by a shoulder 47 thereon striking a stationary block 48. It is apparent that pinion 23 is advanced this one increment, when engaged, only during those operations where the carriage is in a position to place lug 27 in front of hook 30. During all other operations hook 30 moves forward in the machine with shaft 22, spring 39 holding slide 38 in its lower position.

After an increment of movement has been imparted to pinion 23, the parts remain in their moved position during the remainder of the operation. At the beginning of the next operation the parts are returned by the following mechanism.

A plate 51 is pivoted at 52 and has a rod 53 extending along its lower edge. A link 54 has an upstanding projection 55 and is suspended at its rear end to an arm 56 secured on one end of shaft 42. Another arm (not shown) similar to arm 56 is secured to the other end of shaft 42. A rod 57 is secured at its ends to the two arms to swing therewith. A spring 58 tensions rod 57 toward the rear of the machine.

At the beginning of the operation, plate 51 (corresponding to plate 264 in the above mentioned Patent No. 2,194,270 and plate 155 in the British patent) is moved clockwise, causing rod 53 to contact projection 55 and move link 54 forward. This causes rod 57 to swing toward the front of the machine and rotate bell crank 41 clockwise. This moves rack 18 one step downwardly and allows slide 38 to drop to its position shown in Figure 6. Upon the subsequent return movement of plate 51, bell crank 41 again presses against the vertical shoulder on slide 38.

The cam surfaces 28 and the spring 32 are provided to prevent damage to the parts if the carriage is tabulated while the pinion 23 is engaged with rack 18.

It is obvious that by entering an original date in pinion 23 by use of the month keys 1 and by thereafter advancing the pinion one increment and taking a sub-total, alternately, successive months may be printed opposite consecutive items. It may be noted here, that the zero stop means for the "Month" type bar includes the type bar lock plate 810 (Figure 5), pivoted at 265 and operated by lugs in the No. 13 carriage control position (see Figure 17), through rod 816, and bell cranks 815 and 812. This type bar lock cooperates with the date type bars in the same manner as the one shown in Patent No. 2,194,270. It should also be noted here that pinion 23 and its rack 18 are situated to the left of the amount rack of highest order, making it possible to take totals and sub-totals from both the totalizer and the pinion 23 at the same time.

To make it possible to print the same day of the month opposite the printing of successive months, the key restoring mechanism for the "Day" key bank is rendered ineffective so that a depressed "Day" key will remain depressed until manually released.

This is accomplished by suitably notching the key release bar (not shown) corresponding to the bar 220 (Figure 14) in Patent No. 2,194,270. With this arrangement, to print the "day" it is only necessary to remove the lock plate 810 to allow the "Day" type bar or bars to rise until arrested by the extended key stop or stops.

RAISING MAGAZINE SLIDE OPERATING CAM BY OVERDRAFT OR BY MANUAL CONTROL

It is desirable to have an overdrafting of the totalizer change the carriage controls to such an extent that the machine will come to rest at the proper time, that is, when the last regular installment amount and the accompanying balance are printed. To accomplish this, provision has been made for causing the overdraft slide to raise the magazine slide control cam to its upper position. To exercise a similar manual control, provision has also been made for raising the cam by a lever at the right side of the keyboard. Referring to Figures 3, 4, 9 and 10, an overdraft slide 61 is mounted for sliding movement forward and rearward of the machine. A link 62 is connected to the slide by a spring 63, the link being supported on the slide by a pin and slot connection. Link 62 is connected at its rear end, by a pin and slot connection, to a bail 64 pivoted on a rod 65. A spring 66 (Figures 3 and 4) is secured to the machine frame and to a long stud 67 secured to bail 64. A magazine slide control cam 68 is mounted on the machine frame for vertical sliding movement, and has a shoulder 71 at its lower end lying above stud 67. A spring 72 is secured to cam 68 and to stud 67 to connect these parts for simultaneous movement. Referring to Figures 4, 9 and 10, it is seen that the upper end of cam 68 lies in the path of the rear ends of magazine slides 73 mounted for forward and rearward movement on control magazines 74. These magazines are rigidly secured to the under side of control plate 75 on the rear of the carriage.

As explained in the above mentioned patents, tabulation of the carriage causes magazine slides 73 to move into the path of control cam 68, whereby they are moved a short distance toward the front of the machine, for the purpose of retracting one or more of the projecting control lugs, or for the purpose of moving a skip cam into position for allowing the carriage to skip that particular columnar position. Since the details of this mechanism do not constitute a part of the invention they will not be described. As shown in Figure 4, different control slides 73 have their rear ends lying in different elevations so that some of the slides are operated when cam 68 is in its elevated position while others of the slides are operated when the cam is in its lower position. It might be noted that cam 68 is quite similar to cam 852 in the above mentioned Patent No. 2,194,270.

When the machine is cycled after the cross-footer overdrafs from positive to negative, slide 61 (338 in the above mentioned Patent No. 2,194,270) moves forward to its position shown in Figure 10, whereupon springs 63 and 66 oscillate bail 64 and raise cam 68 to the position shown in Figure 10.

Referring to Figures 3 and 4, a plate 76 is pivoted at 77 to cam 68 and is tensioned counter-clockwise by a spring 78. The lower portion of plate 76 is provided with a horizontal shoulder 81. A post 82 extends from the machine frame and carries a stud 83 lying in the vertical plane of plate 76. When cam 68 is raised, as above described, spring 78 brings shoulder 81 above stud 83 to hold cam 68 in its elevated position after overdraft slide 61 is returned to its rear position.

A bell crank 84 is pivoted to plate 76 at 85 and is tensioned clockwise by a spring 86. The horizontal arm of the bell crank rests on top of plate 76 to limit its clockwise movement.

The magazines 74 in the 4th and 10th columnar positions are provided with rearwardly extending studs 87 and 88, respectively, lying in the path of the upper arm of bell crank 84. Looking at the rear of the machine, when the carriage travels from right to left, that is, on its return stroke, studs 87 and 88 rotate bell crank 84 about its pivot, the latter being returned by the tension of spring 86. During the working stroke, however, studs 87 and 88 are effective to rotate plate 76 clockwise to remove shoulder 81 from stud 83 to allow cam 68 to drop to its lower position.

Since cam 68 is tensioned upwardly by spring 66, a stronger spring 91 situated at the left of Figure 9 is connected to bail 64 by a link 92 to insure that cam 68 will be lowered when plate 76 is oscillated. It might be noted that springs 63 and 66 are strong enough to overcome the tension of spring 91 when slide 61 is moved forward.

Cam 68 may also be raised manually by a lever 93 (Figure 9) pivoted at 94 to the machine frame. The lower end of lever 93 is pivoted to link 92 and has a stud 95 lying in a cut out portion of a detent 96 to limit forward and rearward movement of the lever. Operation of the lever relieves bail 64 and cam 68 of the tension of spring 91, allowing spring 66 to raise cam 68 to its upper position.

CARRIAGE RETURN IN NORMAL OPERATIONS

Referring to Figure 11, a shaft 97 is rotated in the direction of the arrow by the electric motor (not shown). A sleeve 98 is fitted on a reduced portion 101 of shaft 97 and is slidable thereon vertically. A pin 102 extending through shaft 97 projects into a slot cut in sleeve 98 to insure rotation of the sleeve with the shaft. One or more teeth 103 are provided on the upper end of sleeve 98 to act as one part of a clutch. A pinion 104 is journaled on a further reduced portion 105 of shaft 97 and engages rack teeth 106 on a bar 107 (see also Figure 12) rigidly secured to the traveling carriage. One or more teeth 108 on the bottom of the hub of pinion 104 lie in position to be engaged with teeth 103 when the latter are raised into the horizontal plane thereof so that pinion 104 may be driven with shaft 97 and sleeve 98 to return the carriage to its right hand position. This mechanism is substantially the same as disclosed in the above mentioned Patent No. 2,194,270.

The means for raising sleeve 98 so that teeth 103 and 108 may engage to return the carriage includes an engaging block 111 secured on a bar 112 (see also Figure 12) carried under bar 107. A three-arm bell crank 113 is journaled on a stud 114 extending from the machine frame. An arm 115 on the bell crank lies normally in the path of block 111. A blade 116 extending from another arm of the bell crank lies within a groove in sleeve 98. The third arm 117 of the bell crank co-operates with a spring pressed detent 118. When the carriage reaches the end of its leftward movement, block 111 rocks bell crank 113 counter-clockwise by contact with arm 115 and thereby engages the clutch. The rotation of shaft 97 and sleeve 98 then returns the carriage to the right.

A block 121 secured to bar 112 has a flange 122 lying in the path of arm 115. As the carriage moves to the right, flange 122 strikes arm 115 and thereby returns bell crank 113 to the position shown in Figure 11. This disengages the clutch and allows the customary carriage spring to draw the carriage an increment to the left until the forward end of one of the magazines 74 (Figure 11) strikes the tabulating escapement lever 123. Detent 118 is effective to retain bell crank 113 in either of its moved positions.

CARRIAGE FULL RETURN MECHANISM

Means is also provided to return the carriage either from an intermediate position or its left hand position to a position farther to the right than the position to which it is normally returned. This movement will be termed "a full return," and this position the "fully returned" position. The means for moving the carriage to its fully returned position includes a full return key 124 (Figure 11) secured to a shaft 125. An arm 126 secured to the left end of shaft 125 lies behind a pin 127 secured in an arm 128 secured on the left end of a shaft 131. A spring 132 tensions arm 128 to the rear. A link 133 embraces pin 127 and is supported for sliding movement on a stationary pin 134. An upstanding projection on the rear end of link 133 is notched to embrace bell crank 113. By these connections, depression of the full return key 124 allows spring 132 to push link 133 and bell crank 113 to the rear, the latter sliding on its pivot stud 114. When bell crank 113 reaches its rear position, detent 118, resting normally on a surface 135 (Figure 14) of arm 117, drops to a surface 136, holding bell crank 113 in its rear position.

An arm 137 extending downwardly from key 124 oscillates a lever 138 to move a link 141 forward to release the machine for operation when the full return key is depressed. This mechanism operates the same way as disclosed by depression of key 919 in the above mentioned Patent No. 2,194,270.

When bell crank 113 is in its rear position it lies in the path of a spring pressed detent 142 on a block 143 secured to bar 112, and still lies in the path of block 111. If the full return key is depressed with the carriage in a position where block 143 is to the right (Figure 11) of bell crank 113, tabulation of the carriage at the end of the ensuing cycle resulting from depression of the full return key causes detent 142 to oscillate bell crank 113 to engage the clutch. The rearward movement of bell crank 113 carries its arm 115 out of the path of flange 122 and into the path of the cut out portion at the rear thereof, the parts being in the position illustrated in Figure 12. Therefore, the carriage will return to the right until a flange 144 on another block 145 secured to bar 112 strikes arm 115 to disengage the clutch. This brings the carriage to the first columnar position.

If the full return key is depressed when the carriage is in a position where the block 142 is to the left (Figure 11) of bell crank 113, the carriage will not be returned immediately but will continue its working stroke until block 111 operates bell crank 113 to initiate the return movement. As before, the cut out portion of block 121 passes over arm 115 and allows flange 144 to disengage the clutch.

Depression of the full return key, as explained above, causes detent 118 to fall on surface 136 of arm 117. This position of the parts is illustrated in Figure 15. Bell crank 113 is thereby held in its rear position until one of the engaging blocks 111 or 143 moves bell crank 113 counter-clockwise. Detent 118 then rests on a surface 146 (Figure 14). When the bell crank is thereafter rocked clockwise to its initial position by flange 144, detent 118 is restored to surface 135. The bell crank 113 is now free to return to its forward position by the tension of a spring 147 (Figure 11).

A more detailed explanation of this mechanism, together with the manner in which key 124 is returned to its raised position, is disclosed in connection with key 919 in the above mentioned Patent No. 2,194,270.

CUSHION FOR CARRIAGE RETURN MECHANISM

To relieve the shock caused by the weight of the carriage when blocks 111 or 143 strike arm 115, a cushion is provided between these blocks and the carriage. As explained above, these blocks are secured to a bar 112 carried under the bar 107. Bar 112 is slidably supported in two mountings 148 (Figure 16), only one of which is shown, and is tensioned to the left by a spring 152 connected to bar 107 and bar 112. Leftward movement of bar 112 is limited by a forwardly extending projection 153 on the extreme right end of bar 112 contacting a post 154 extending downwardly from bar 107. When the carriage tabulates to the left, and block 111 or 143 strikes arm 115, the carriage continues a short distance to the left, stretching spring 152 and thereby relieving the shock.

EXAMPLES OF WORK

*The usual form*

The type of work customarily performed by this class of machine is illustrated at the bottom of Figure 17 and is performed in the following manner. Let us assume that the customer borrows $500.00 to be re-paid in five monthly installments of $100.00 each, beginning on April 5th. The operator inserts the record sheet in the machine with the carriage resting in the 5th columnar position. It should be remembered that the 5th column is the normal home position, and that the reason for the machine stopping in this position is because the control cam 68 (Figure 10) is at this time latched in its upper position, where it does not operate the magazine slide in the 5th column to move the skip cam 155 forward to depress the tabulating escapement lever 123.

The operator first sets up the $500.00 loan on the keyboard and operates the machine by depressing the motor bar. This enters the amount in the crossfooter, and since there is a non-print lug in the 5th column, the amount is not printed at this time. The machine now tabulates to the 6th columnar position. By referring to the top of Figure 17 it will be noted that the magazine slide in this position also lies beneath cam 68, which is still in its upper position, so that skip cam 156 likewise is ineffective to cause column skipping.

The operator now sets up the $100.00 installment payment on the amount keyboard, sets up April 5 (the date the first installment is due) on the date keyboard, and operates the machine by depressing the motor bar. The presence of a lug in the 3rd carriage control position prevents this $100.00 amount from being added into the crossfooter. A lug in the 11th position selects the "B"

register so that the $100.00 installment payment will be entered therein. A lug in the 12th position causes the date pinion 23 (Figure 6) to be engaged with its rack 18 so it can be advanced four increments under control of the April key on the keyboard. A lug in the 13th position allows the date type bars 4 (Figure 5) to rise, as disclosed in the above mentioned Patent No. 2,194,270, and a lug in the 17th position prevents printing. The carriage then tabulates to the 7th column.

Referring to the top of Figure 17, it will be seen that the magazine slide for the 7th column occupies the upper position, causing this slide to be operated by control cam 68, moving skip cam 157 into effective position and causing the carriage to skip the 7th column. The motor repeat lug in the 16th control position of this column is retracted by such movement of the control slide, so that the machine is not released for an operation as the carriage passes through this column.

As the carriage reaches the 8th column it is stopped, since although the magazine slide in this position is operated, there is no skip cam thereon. Movement of the magazine slide retracts the lug in the 12th control position so that the only effective lug is the motor repeat lug in the 16th position. This is therefore merely a blank cycle on the first line of the record sheet. The carriage then tabulates to the 9th columnar position.

A lug in the 5th control position of this column causes the sub-total of $500.00 to be taken from the crossfooter and printed on the record sheet. Lugs in the 8th and 11th positions cause the "B" register to be selected but prevent the $500.00 from being transferred thereto from the crossfooter. This selecting of the "B" register is for the purpose of sub-totaling in the 10th position. A lug in the 1st position then causes the record sheet to feed up one step, and a lug in the 16th position causes the machine to operate and tabulate to the 10th column. As the machine reaches the 10th column, stud 88 causes control cam 68 to be dropped to its lower position, as indicated by the arrow at the top of Figure 17, and as explained above.

In this column lugs in the 2nd and 7th positions cause a sub-total to be taken from the "B" register and this $100.00 amount to be subtracted from the crossfooter, leaving $400.00 therein. A lug in the 17th position prevents printing in this column and a lug in the 16th position causes the machine to operate and tabulate to the 11th column.

In this column lugs in the 11th and 12th positions engage the "B" register and date pinion for the next operation, and a lug in the 16th position operates the machine and causes it to tabulate to the 12th column.

Since the control cam is now in its lower position, and since the magazine slide for the 12th column is also in the lower position, the slide is operated, placing skip cam 158 in effective position to skip the column. As in the 7th column, a retracting lug in the 16th control position prevents the machine from being operated as the carriage passes through this column.

The carriage is then returned by the cooperation of blocks 111 and 121 (Figure 11) with bell crank 113, the carriage being released from the return mechanism at the 5th column. However, since the control cam 68 is now in its lower position, the 5th and 6th columns are skipped, the machine coming to rest in the 7th column.

Lugs in the 3rd, 7th and 11th control positions cause a sub-total to be taken and printed from the "B" register and prevent it from being added into the crossfooter, while the lug in the 7th position, together with lugs in the 12th and 13th positions, cause, in effect, a sub-total to be taken and printed from the date pinion. It will be remembered that the date pinion and the "B" register were conditioned for such sub-totaling during the last operation, that is, the operation in the 11th columnar position. It will also be remembered that it is possible to take a sub-total from both the date pinion and the "B" register simultaneously since the date pinion is controlled by a rack to the left of the pinion of highest order in the "B" register. This printing appears on the second line of the record sheet as "April 5_____$100.00." Since, on this excursion of the carriage with the control cam 68 in its lower position, the magazine slide is not operated, the lug in the 16th position remains in effective position to cause operation and tabulation to the 8th column.

The magazine slide in the 8th column likewise is not operated, causing the lug in the 12th position to be effective to engage the date pinion. Since, in this particular column, lug 27 (Figures 6 and 8) lies in front of hook 30, subsequent operation of the machine by a lug in the 16th position causes an increment of movement to be imparted to the date pinion 23. The carriage then tabulates to the 9th column.

As on the last excursion, a sub-total ($400.00) is taken from the crossfooter and printed on the record sheet. The "B" register is engaged but the sub-totaled amount is not added thereto.

In the 10th column a sub-total is taken from the "B" register and subtracted from the crossfooter, leaving $300.00 therein.

In the 11th column the date pinion and "B" register are engaged preparatory to sub-totaling during the next operation.

As before, the 12th column is skipped and the carriage is returned to the 5th column.

The 5th and 6th columns are again skipped, bringing the carriage to the 7th position where the entry "May 5_____$100.00" is printed. The machine continues to operate in the above manner, printing the months consecutively and decreasing the balance uniformly by $100.00 amounts until the balance reaches zero on the 6th line of the record sheet.

After this balance of zero is printed in the 9th column, the carriage tabulates as before to the 10th column where a sub-total is again taken from the "B" register and subtracted from the crossfooter, causing, this time, an overdraft of $100.00.

The machine then tabulates to the 11th column where the date pinion and "B" register are engaged, and since a negative total appears in the crossfooter, the overdraft slide 61 (Figure 10) moves forward, raising control cam 68 to its upper position, as shown in Figure 10 and as indicated by an arrow at the top of Figure 17.

Since control cam 68 is now elevated, the magazine slide in the 12th position is not operated, causing the skip cam 158 to be ineffective for skipping this column as it did on all previous operations. Also the failure of the magazine slide to operate causes lugs in the 6th and 16th positions to remain effective for this operation. The lugs in the 6th and 13th positions cause the date wheel and "B" register to be returned to zero, both of these mechanisms having been engaged during the last operation. The absence of a lug in the 3rd position allows the $100.00 amount taken from the "B" register to be reinserted in the crossfooter, restoring it to zero. A lug in the 17th position prevents printing and the lug in the 16th position causes the machine to operate and return to the 5th column.

Now since control cam 68 is in its upper position, the magazine slide in the 5th position will not be operated, causing the machine to come to rest at this point. The record sheet is then taken from the machine.

Since the date pinion, the "B" register and the crossfooter are all standing at zero, the machine is ready to have the next record sheet inserted and printed.

Changing installment amount

At times a loan is repaid by installments of different amounts. For example, in Figure 18 a loan of $700.60 is repaid by $200.00 for the first two installments and by subsequent installments of $100.00. It is therefore necessary to change the installment amount during the printing of the record. This is accomplished as follows:

After the operator enters the amount of the loan, the installment amount of $200.00, and the date the first installment is due and starts the machine as before, a close watch is kept on the printing of the record. As soon as the desired number of $200.00 installments and the next succeeding balance are printed, the operator depresses the full return key. Since the depression of this key does not affect the tabulating mechanism, the machine continues its operation through the 12th column. As explained before, however, depression of this key causes the carriage to return to the 1st column instead of the 5th.

In the 1st column lugs in the 11th and 16th positions cause the "B" register to be engaged and the machine operated and tabulated to the 2nd column.

In this column lugs in the 6th and 16th positions cause the installment amount of $200.00 to be taken from the "B" register, and the absence of a lug in the 3rd position causes this amount to be added into the crossfooter, restoring the crossfooter to the amount of $300.60. It will be remembered that after this amount of $300.60 was printed on the 3rd line, the $200.00 installment amount was subtracted from it in the 10th column. A lug in the 17th position prevents printing in the 2nd column.

In the 3rd column the operator enters the amount of the reduced payment ($100.00) on the keyboard and operates the machine. Lugs in the 2nd and 11th positions cause the amount to be entered in the "B" register and subtracted from the crossfooter, making a balance of $100.00 in the "B" register and $200.60 in the crossfooter. A lug in the 17th position prevents printing. Since at this time the control cam 68 is in its lower position, the magazine slide in the 3rd column is operated, retracting the lug in the 13th position. Therefore, although the date pinion is engaged for this operation, its position is not altered since the date type bars are held down.

At the 4th column the date pinion and "B" register are engaged preparatory to the customary sub-totaling of these mechanisms in the 7th column.

Since the control cam 68 is still in its lower position, the 5th and 6th columns are skipped.

In the 7th column the new installment amount of $100.00 is printed with the advanced date, as in the previous excursions, and in the 9th column the balance of $200.60 is printed. The machine then continues its operations just as though the decreased installment amount of $100.00 had been entered at the beginning instead of the $200.00 amount.

Printing a residual balance

After the machine prints the balance of $.60 on the 6th line of the record sheet it subtracts the $100.00 installment amount in the 10th column, causing an overdraft. Now, when the machine engages the date pinion and "B" register in the 11th column, the overdraft slide 61 raises the control cam 68 and thereby prevents operation of the magazine slide in the 12th column. Therefore, the date pinion is restored to normal and the installment amount of $100.00 is taken from the "B" register and added back in the crossfooter, restoring it to $.60. The carriage then returns to the 5th column and comes to rest.

Depression of the full return key then, by cooperation of detent 142 (Figure 11) with arm 115 causes the carriage to be returned to the 1st column. The machine operates in the 1st and 2nd columns which serve no useful purpose in this instance since the "B" register has already been cleared. In the 3rd column the amount of the residual balance is set up on the keyboard, and since the date pinion was returned to normal in the 12th column, the next month following the last month automatically printed must be set up on the date keys. Since the control cam 68 is now in its upper position, the lug in the 13th position is effective to allow the date type bars to rise and enter the set up month in the date pinion. Lugs in the 2nd and 11th positions cause the residual balance set up to be entered in the B register and subtracted from the crossfooter, in this instance entering $.60 in the B register and subtracting $.60 from the crossfooter, leaving it at zero. The lug in the 17th position prevents printing of this data. The motor bar is then depressed to operate the machine. In the 4th column the date pinion and "B" register are engaged preparatory to sub-totaling, and the stud 87 causes the control cam 68 to be dropped to its lower position.

This causes the 5th and 6th columns to be skipped, the carriage coming to rest in the 7th column.

In the 7th column sub-totals are taken from the "B" register and date pinion, causing $.60 to be printed as the installment of September 6.

In the 8th column the date pinion is advanced, but since no further dates will be printed this is in effect a blank stroke.

In the 9th column the zero balance is printed and the "B" register is engaged for sub-totaling.

In the 10th column a sub-total is taken of the $.60 amount in the "B" register, and that amount is subtracted from the crossfooter, overdrafting it. The machine now continues as in connection with the usual form, whereby the date pinion and "B" register are cleared in the 12th column, the $.60 total taken from the "B" register being entered in the crossfooter additively to bring it to zero, and the machine is brought to rest in the 5th column.

Clearing erroneous entry from machine

In the event the operator observes that an error has been made in entering any of the original data, the machine may be brought to rest by pulling the lever 93 forward. This allows control cam 68 to rise so that the machine is brought to rest in the 5th column, instead of skipping the 5th and 6th columns and operating in the 7th.

If the control lever is pulled forward before the carriage reaches the 12th column, it stops in this column and operates. This clears the "B" register and date pinion, and transfers the amount in the "B" register to the crossfooter before the carriage comes to rest in the 5th column. The crossfooter now contains the amount of the last printed balance. It is therefore necessary to clear the crossfooter before the correct amounts can be entered.

However, if the lever is pulled forward after the carriage passes through the 12th column and before it reaches the 5th column, it will stop in the 5th column as before but the "B" register and date pinion will not have been cleared. In this event, the "B" register will contain the installment amount, the date pinion will contain the appropriate date, and the crossfooter will contain the amount of the last printed balance diminished by one installment amount.

In either event, the operator then depresses the full return key to move the carriage to its extreme right hand position so that the machine can operate in the 1st, 2nd, 3rd and 4th columns. If the machine operated in the 12th column before the lever was pulled forward, the operations in the 1st and 2nd columns will have no effect. However, if the lever was pulled forward after the machine passed through the 12th column, the "B" register will be cleared and the amount therein transferred to the crossfooter when the machine operates in the 2nd column. Therefore, when the machine comes to rest in the 3rd column, the "B" register is cleared and the crossfooter contains the amount of the last printed balance. In one case the date pinion is at this point standing at zero, and in the other case it is not.

The operator then sets up on the keyboard the amount of the last printed balance and depresses the motor bar. This enters the amount of the last printed balance in the "B" register and subtracts it from the crossfooter, zeroizing the crossfooter. The machine then operates in the 4th column, but the operation has no beneficial effect. At this time stud 87 releases cam 68 for movement to its lower position, causing the carriage to pass through the 5th and 6th columns and stop in the 7th. The operation in this column, as well as the operation in the 8th and 9th columns, have no beneficial effect. Incidentally, operation in the 8th column advanced the date pinion one step.

Operation in the 10th column subtracts the amount in the "B" register from the crossfooter, overdrafting it to this extent.

Operation in the 11th column selects the date pinion and "B" register and raises cam 68 to its upper position. With cam 68 in this position, the carriage stops in the 12th column where a total is taken from the "B" register, returning it to zero and transferring the amount additively to the crossfooter, returning it also to zero. Since the date pinion was engaged in the 11th column along with the "B" register, it also is returned to zero in the 12th column. The carriage now returns to the 5th column with the machine in condition to receive a new entry.

While the form of mechanism herein shown and described is admirably adapted to fulfill the objects primarily stated, it is to be understood that it is not intended to confine the invention to the one form of embodiment herein disclosed for it is susceptible of embodiment in various forms all coming within the scope of the claims which follow.

What is claimed is:

1. In a machine of the class described, an amount retaining device, means for entering amounts therein, a traveling paper carriage, means, including mechanism on the carriage for controlling the accounting functions of the machine, and means, including part of the second mentioned means and additional mechanism on the carriage, for automatically restoring the amount retaining device, after an erroneous amount has been entered therein, to its previous condition, upon indexing said erroneous amount on the keyboard and initiating operation of the machine at a predetermined carriage position.

2. In a machine of the class described, a plurality of totalizers, means whereby one amount may be entered on one totalizer and another amount may be entered on a second totalizer, means to repeatedly deduct the second amount from the first during continuous machine operation, and means controlled by the first totalizer according to the nature of the total therein to arrest operation of the machine.

3. In a machine of the class described, a plurality of totalizers, means whereby one amount may be entered on one totalizer and another amount may be entered on a second totalizer, means to repeatedly deduct the second amount from the first during continuous machine operation, means to print the balance of the first amount after each deduction, and means controlled by the first totalizer in accordance with the nature of the total therein to arrest operation of the machine.

4. In a machine of the class described, an amount retaining device, a second amount retaining device, means to enter an amount in one retaining device during one machine cycle, and an amount in the other retaining device during another machine cycle, means to repeatedly deduct the amount retained in the second device from the amount retained in the first device during continuous machine operation, and means to print the balance of the amount retained in the first device after each of one or more deductions.

5. In a machine of the class described, an amount retaining device, a second amount retaining device, means whereby one amount may be entered in one retaining device and another amount may be entered in the other retaining device, means including subtraction mechanism and automatic operation mechanism to repeatedly deduct the amount retained in the second device from the amount retained in the first device during continuous machine operation, means to print the balance of the amount retained in the first device after each of one or more deductions, and means to render the automatic operation mechanism ineffective at a predetermined time after the amount in the first device becomes smaller than the amount in the second device.

6. In a machine of the class described, an amount retaining device, a second amount retaining device, means whereby one amount may be entered in one retaining device and another amount may be entered in the other retaining device, means including subtraction mechanism and automatic operation mechanism to repeatedly deduct the amount retained in the second device from the amount retained in the first device during continuous machine operation, means to print the balance of the amount retained in the first device after each of one or more deductions, and means controlled by the first device to render the automatic operation mechanism ineffective.

7. In a machine of the class described, an amount retaining device, a second amount retaining device, means whereby one amount may be entered in one retaining device and another amount may be entered in the other retaining device, means including subtraction mechanism and automatic operation mechanism to repeatedly deduct the amount retained in the second device from the amount retained in the first device during continuous machine operation, means to print the balance of the amount retained in the first device after each of one or more deductions, and means to render the automatic operation mechanism ineffective after the printing means prints a balance smaller than the amount retained in the second device, and before it prints a negative balance.

8. In a machine of the class described, an amount retaining device, a second amount retaining device, means whereby one amount may be entered in one retaining device and another amount may be entered in the other retaining device, means to repeatedly deduct the amount retained in the second device from the amount retained in the first device during continuous machine operation, printing means, means to control the printing means to print the balance of the amount retained in the first device after each of one or more deductions, and means to control the printing means to print the amount retained in the second device in association with each printing of the balance.

9. In a machine of the class described, an amount retaining device, a second amount retaining device, means to enter an amount in each retaining device, means to repeatedly deduct the amount retained in the second device from the amount retained in the first device during continuous machine operation, and means to automatically return the second device to zero after the balance in the first device becomes smaller than the amount entered in the second device.

10. In a machine of the class described, an amount retaining device, a second amount retaining device, means to enter an amount in each retaining device, a date retaining device, means to enter a date therein, means to periodically advance the date and to repeatedly deduct the amount in the second device from the amount retained in the first device during continuous machine operation, and means to print the date after each advance and the balance of the first amount after each of one or more deductions.

11. In a machine of the class described, an amount retaining device, a second amount retaining device, means to enter an amount in each retaining device, a date retaining device, means to enter a date therein, means to periodically advance the date and to repeatedly deduct the amount in the second device from the amount retained in the first device during continuous machine operation, means to print the balance of the amount retained in the first device after each deduction, and means to print the second amount in association with each printing of the balance.

12. In a machine of the class described, an amount retaining device, a second amount retaining device, means to enter an amount in each retaining device, means to repeatedly deduct the amount retained in the second device from the amount retained in the first device during continuous machine operation, a traveling carriage, a key to control carriage return, and means controlled by depression of the key to return the second device to zero.

13. In a machine of the class described, an amount retaining device, a second amount retaining device, means to enter an amount in each retaining device, means to repeatedly deduct the amount retained in the second device from the amount retained in the first device during continuous machine operation, a traveling carriage, a key to control carriage return, and means controlled by depression of the key, while the machine is operating, to reset the second device before the machine stops operating.

14. In a machine of the class described, an amount retaining device, a second amount retaining device, means whereby one amount may be entered in one retaining device and another amount may be entered in the other retaining device, a traveling paper carriage, and means, controlled by the carriage to repeatedly deduct the amount retained in the second device from the amount retained in the first device, once during each excursion of the carriage, and during continuous operation of the machine.

15. In a machine of the class described, an amount retaining device, a second amount retaining device, means whereby one amount may be entered in one retaining device and another amount may be entered in the other retaining device, a traveling paper carriage, means, controlled by the carriage, and including subtraction mechanism and automatic operation mechanism to repeatedly deduct the amount retained in the second device from the amount retained in the first device, once during each excursion of the carriage, and during continuous machine operation, means to print the balance of the amount retained in the first device after each deduction, and means to render the automatic operation mechanism ineffective after the printing means prints a balance smaller than the amount retained in the second device, and before it prints a negative balance.

WALTER A. ANDERSON.